United States Patent
Shoemaker

[11] 3,888,567
[45] June 10, 1975

[54] 10X THREE ELEMENT EYEPIECE
[75] Inventor: Arthur H. Shoemaker, West Aurora, N.Y.
[73] Assignee: American Optical Corporation, Southbridge, Mass.
[22] Filed: May 1, 1974
[21] Appl. No.: 465,934

[52] U.S. Cl. .................. 350/229; 350/175 E
[51] Int. Cl. ............................. G02b 9/22
[58] Field of Search .............. 350/229, 175 E

[56] References Cited
UNITED STATES PATENTS
1,759,529  5/1930  VanHofe.................. 350/229

Primary Examiner—Paul A. Sacher
Attorney, Agent, or Firm—Alan H. Spencer; William C. Nealon; H. R. Berkenstock, Jr.

[57] ABSTRACT

A three element 10X eyepiece has an apparent field of view of about 52.3° and a maximum exit pupil diameter of 1.60mm.

3 Claims, 1 Drawing Figure

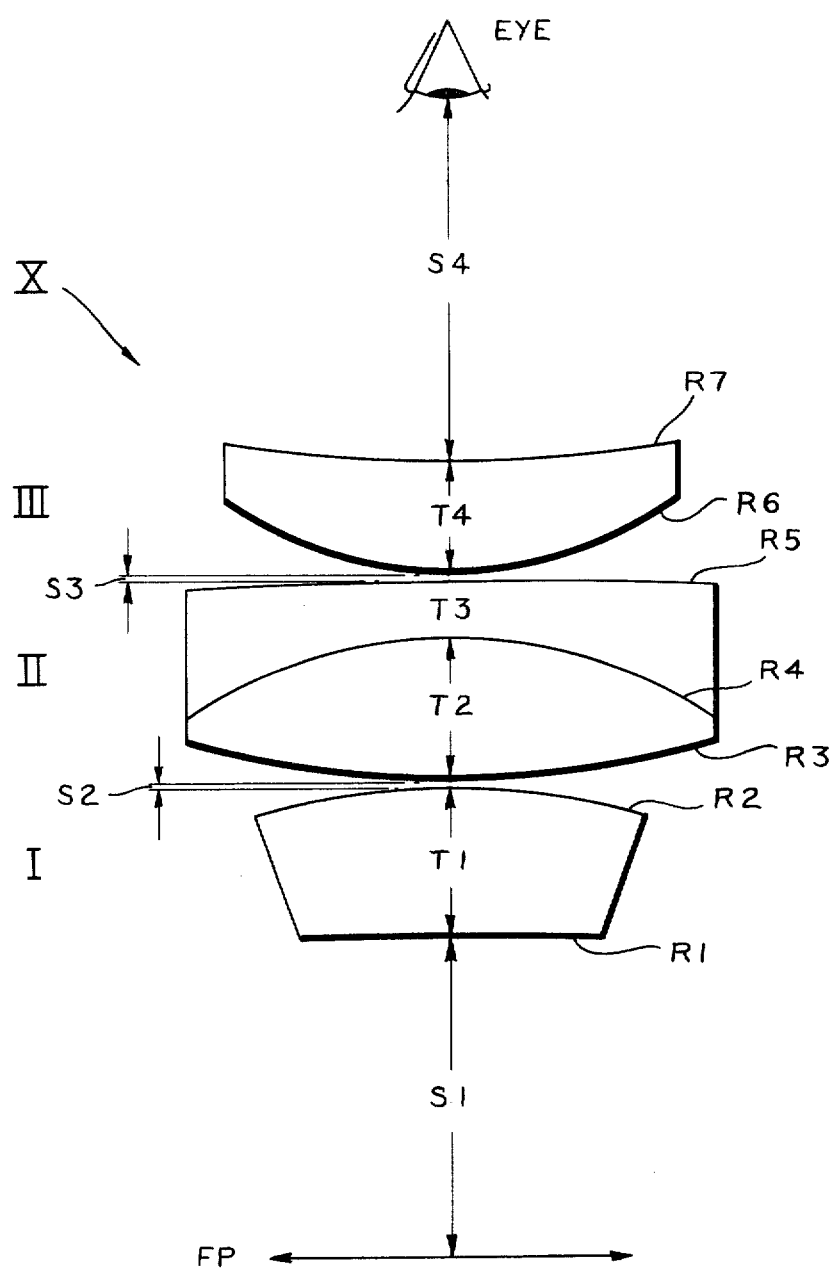

10X THREE ELEMENT EYEPIECE

BACKGROUND OF THE INVENTION

This invention relates to microscope eyepieces, and more particularly, relates to an eyepiece having a magnification of substantially 10X, an apparent field of view of about 52.3° and a maximum exit pupil diameter of 1.60mm. It is an object of this invention to provide an eyepiece which is well-corrected for coma, astigmatism, distortion, lateral color and pupil aberration, especially pupil color and spherical aberrations.

THE DRAWING

FIG. 1 is an optical diagram of the eyepiece viewed transverse to the optical axis.

DESCRIPTION OF THE INVENTION

Referring to FIG. 1, an eyepiece X, is shown diagramatically with optically aligned lenses I, II and III. The first element I is a concavo-convex positive singlet, the second element is a double convex positive doublet and the third element III is a convex-concavo positive singlet. The eyepiece has a Petzval radius of about 1.42F and eye-relief of about 0.77F which is adequate for confortable viewing with or without eyeglasses.

The parameters of an eyepiece according to the present invention are set forth in Table I with the axial thickness of successive lens elements designated T1 to T4, and the successive axial spaces from the eyepiece focal plane FP to the observer's eye designated S1 to S4. The successive lens radii are designated R1 to R7 where the minus sign (−) applies to surfaces whose center of curvature lies on the focal plane side of their vertices. The refractive indices and Abbe numbers of the glasses in the successive lenses are fixed absolute values designated ND(1) to ND(4), and $\nu(1)$ to $\nu(4)$ respectively.

TABLE I

| Lens | Radius | Thickness | Space | Refractive Index | Abbe Number |
|------|--------|-----------|-------|------------------|-------------|
|      |        |           | $S_1$=0.6782F |        |             |
| I    | $R_1$=−6.7853F | $T_1$=0.3210F |         | ND(1)=1.58800 | $\nu(1)$=61.19 |
|      | $R_2$=−1.4710F |         | $S_2$=0.0040F |         |             |
|      | $R_3$= 2.1120F |         |         |         |             |
| II   | $R_4$=−0.9932F | $T_2$=0.3090F |         | ND(2)=1.58800 | $\nu(2)$=61.19 |
|      | $R_5$=−6.7853F | $T_3$=0.1204F |         | ND(3)=1.78600 | $\nu(3)$=25.52 |
|      |        |           | $S_3$=0.0040F |         |             |
|      | $R_6$= 0.8399F |         |         |         |             |
| III  | $R_7$= 3.0924F | $T_4$=0.2408F |         | ND(4)=1.58800 | $\nu(4)$=61.19 |
|      |        |           | $S_4$=0.7725F |         |             | wherein F is the focal length of the eyepiece in millimeters.

An embodiment of the present invention with a focal length (F) of 24.919 has the following values:

| Lens | Radius | Thickness | Space |
|------|--------|-----------|-------|
|      |        |           | $S_1$=16.90 |
| I    | $R_1$=−169.084 | $T_1$=8.000 |         |
|      | $R_2$=−36.657 |         |         |
|      |        |           | $S_2$= 0.10 |
|      | $R_3$= 52.630 |         |         |
| II   | $R_4$=−24.750 | $T_2$=7.700 |         |
|      |        | $T_3$=3.000 |         |
|      | $R_5$=−169.084 |         |         |
|      |        |           | $S_3$= 0.10 |
|      | $R_6$= 20.930 |         |         |
| III  | $R_7$= 77.059 | $T_4$=6.000 |         |
|      |        |           | $S_4$=19.25 |

It will be apparent that the foregoing absolute values are variable depending on the value of F. Other forms are thus possible and changes may be made in the values of the constructional data named on the relationships in the first of the above charts, without departing from the spirit of this invention.

What is claimed is:

1. A microscope eyepiece having a magnification of about 10X, an apparent field of view of about 52.3° and a maximum exit pupil diameter of about 1.6mm, being well corrected for coma, astigmatism, distortion and color and having a focal length F and three lens elements aligned along an optical axis extending from the focal plane of said eyepiece, which comprises a concavo-convex positive singlet I as the first element, a double convex positive doublet II as the second element and a convex-concavo positive singlet III as the third element to provide a Petzval radius of 1.42F and eye relief of 0.77F.

2. The eyepiece according to claim 1 wherein said lens elements have the following values:

| Lens | Radius | Thickness | Space | Refractive Index | Abbe Number |
|------|--------|-----------|-------|------------------|-------------|
|      |        |           | $S_1$= 0.6782F |        |             |
| I    | $R_1$= 6.7853F | $T_1$= 0.3210F |         | ND(1)= 1.58800 | $\nu(1)$= 61.19 |
|      | $R_2$= −1.4710F |         | $S_2$= 0.0040F |         |             |
|      | $R_3$= 2.1120F |         |         |         |             |

-Continued

| Lens | Radius | Thickness | Space | Refractive Index | Abbe Number |
|---|---|---|---|---|---|
| II | | $T_2=$ 0.3090F | | $ND(2)=$ 1.58800 | $\nu(2)=$ 61.19 |
| | $R_4=$ -0.9932F | | | | |
| | | $T_3=$ 0.1204F | | $ND(3)=$ 1.78600 | $\nu(3)=$ 25.52 |
| | $R_5=$ 6.7853F | | | | |
| | | | $S_3=$ 0.0040F | | |
| III | $R_6=$ 0.8399F | | | | |
| | | $T_4=$ 0.2408F | | $ND(4)=$ 1.58800 | $\nu(4)=$ 61.19 |
| | $R_7=$ 3.0924F | | | | |
| | | | $S_4=$ 0.7725F | | | and the axial thicknesses of successive lens elements are T1 to T4, successive axial spaces from the eyepiece focal plane are S1 to S4, successive lens radii are R1 to R7, where the minus sign (−) applies to surfaces whose center of curvature lies on the focal plane side of their vertices, refractive indices and Abbe numbers of the lenses are absolute fixed values ND(1) to ND(4), and $\nu(1)$ to $\nu(4)$ respectively, and F is the focal length in millimeters.

3. The eyepiece according to claim 2 wherein F is 24.919mm.

* * * * *